(12) United States Patent
Hallerud

(10) Patent No.: US 7,491,775 B2
(45) Date of Patent: Feb. 17, 2009

(54) POLYMERIZATION PROCESSES

(75) Inventor: Owen C. Hallerud, Mount. Laurel, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 508 days.

(21) Appl. No.: 11/384,791

(22) Filed: Mar. 20, 2006

(65) Prior Publication Data

US 2006/0217480 A1 Sep. 28, 2006

Related U.S. Application Data

(60) Provisional application No. 60/664,858, filed on Mar. 24, 2005.

(51) Int. Cl.
*C08F 2/22* (2006.01)
*C08F 220/00* (2006.01)

(52) U.S. Cl. .................... 526/88; 526/86; 526/201

(58) Field of Classification Search .............. 526/88, 526/86, 201
See application file for complete search history.

(56) References Cited

U.S. PATENT DOCUMENTS

| | | | |
|---|---|---|---|
| 3,563,946 A | | 2/1971 | Miller et al. |
| 4,539,361 A | * | 9/1985 | Siol et al. ................... 524/458 |
| 4,742,472 A | | 5/1988 | Sugimori et al. |
| 5,264,315 A | | 11/1993 | Tan et al. |
| 6,046,286 A | * | 4/2000 | Kreilein et al. ............... 526/88 |
| 6,245,851 B1 | | 6/2001 | Petrocelli et al. |
| 6,320,000 B1 | | 11/2001 | Hurry et al. |
| 6,498,219 B1 | | 12/2002 | Kröner et al. |
| 6,660,814 B1 | | 12/2003 | Kröner et al. |
| 2002/0001547 A1 | | 1/2002 | Connelly et al. |
| 2003/0162879 A1 | | 8/2003 | Laubender et al. |

FOREIGN PATENT DOCUMENTS

| | | |
|---|---|---|
| DE | 100 41 680 A1 | 3/2002 |
| EP | 0 111 341 A2 | 12/1983 |
| EP | 0 165 416 B1 | 4/1985 |
| EP | 0 486 262 A1 | 12/1991 |
| EP | 0 526 741 B1 | 7/1992 |
| EP | 1160257 | 12/2001 |
| EP | 1160257 A2 * | 12/2001 |
| WO | WO 98/25984 A1 | 6/1998 |

* cited by examiner

*Primary Examiner*—Kelechi C Egwim

(57) ABSTRACT

A process for preparing a polymer comprising selecting temperatures and amounts of a polymerization medium, a surfactant, a monomer or polymer seed, and any desired additives to achieve an initial temperature in a polymerization reactor; adding the polymerization medium and surfactant as contents to the polymerization reactor whereby the surfactant is added within 1.5 times a time period required for polymerization medium addition; and introducing the monomer or polymer seed and the any desired additives as contents to the polymerization reactor, wherein the temperatures and amounts of the contents are selected such that when the additions are completed, the resulting temperature of the contents of the polymerization reactor is within about 5° C. of a temperature at which polymerization is initiated, and wherein less than about 5 kcal of energy is removed or added per liter of contents in the reactor; and initiating polymerization.

10 Claims, No Drawings

POLYMERIZATION PROCESSES

This application claims the benefit of priority under 35 U.S.C. § 119(e) of U.S. Provisional Patent Application No. 60/664,858, filed on Mar. 24, 2005, the disclosure of which is incorporated herein by reference.

The present invention relates to processes for preparing polymers and in particular processes for more efficient polymer manufacturing.

Optimization of commercial emulsion polymerization processes and other polymerization processes is necessary to enable the lowest possible manufacturing costs. Due to the exothermic nature of emulsion polymerizations, the ability to remove heat from large commercial reactors is often the limiting factor in decreasing cycle times. Various techniques for heat removal have been used including optimized reactor cooling jackets, internal cooling coils, and external heat exchangers of different designs (China Synthetic Rubber Industry Vol 17(5), 299-303 (1994); U.S. Pat. Nos. 6,320,000; 6,660,814; EP 526,741, EP 486,262). Computerized process control systems have been used for monitoring and controlling reaction kinetics and parameters (EP 111341; EP 165416; U.S. Pat. No. 4,742,472). These techniques and others have facilitated significant improvements in emulsion batch cycle times for the reaction phase of the process.

However, the productivity of a batch reactor is not determined solely by the time represented by the polymerization or reaction phase of the process. The time to clean and prepare the reactor for the next batch, introduction of the initial process reactants (reactor charges), achieving the appropriate temperature and atmospheric conditions, and any post processing, such as reduction of residual monomer, vacuum stripping to remove volatiles and the addition of performance enhancing additives, all consume and contribute to process cycle time. One method for optimization of this process is multi-reactor or cascade type processing as illustrated by U.S. Pat. No. 6,245,851 for VAE emulsion processing. Concurrent addition of feeds, such as monomer and initiator streams are common practice in the polymerization phase of the reaction as in U.S. Pat. No. 3,563,946.

Although considerable effort has been expended to optimize the polymerization or reaction phase of the manufacturing process, there continues to be a need to optimize the other parts of the process in order to save time and money. Therefore, it is an object of this invention to provide an optimized process for polymerization.

One aspect of this present invention is a process for producing a polymer, comprising selecting temperatures and amounts of a polymerization medium, a surfactant, a monomer or polymer seed, and any desired additives to achieve an initial temperature in a polymerization reactor; adding the polymerization medium and surfactant as contents to the polymerization reactor whereby the surfactant or surfactants are added within 1.5 times a time period required for polymerization medium addition; and adding the monomer or polymer seed and the any desired additives to the contents of the polymerization reactor, wherein the temperatures and amounts of the contents are selected such that when the additions are completed, the resulting temperature of the contents of the polymerization reactor is within about 5° C. of a temperature at which polymerization is initiated, and wherein less than about 5 kcal of energy is removed or added per liter of contents in the reactor; and initiating polymerization.

In one embodiment of the present invention, the polymerization medium is added to the polymerization reactor within a first time period, a portion of the surfactant is added within the first time period, and a remaining portion of the surfactant is added after the first time period.

In another embodiment of the present invention, the polymerization medium and surfactant are added to the polymerization reactor within a first time period.

Another aspect of the present invention is a process for preparing a polymer, comprising selecting temperatures and amounts of water, a monomer or polymer seed, and any desired additives to achieve an initial temperature in a polymerization reactor; adding the water, seed and any desired additives as contents to the polymerization reactor whereby the seed and any desired additives are added within 1.5 times a time period required for water addition; and wherein the temperatures and amounts of the contents are selected such that when the additions are completed, the resulting temperature of the contents of the polymerization reactor is within about 5° C. of the initial temperature, and wherein less than about 5 kcal of energy is removed or added per liter of contents in the reactor; and initiating polymerization.

The polymerization process, including emulsion, miniemulsion, and suspension polymerization, is carried out by supplying to a polymerization reactor, such as a single stirred tank reactor, the materials used in the polymerization. These materials include a polymerization medium, surfactant, monomer or polymer seed, and any desired additives.

The polymerization medium may comprise water alone or mixtures of water and water-miscible organic liquids, such as methanol, ethanol, n-propanol, isopropanol, n-butanol, tert-butanol, tetrahydrofuran, formamide and dimethylformamide. The fraction of these liquids, based on the polymerization medium, is usually less than 10% by weight. Preferably, water alone is used as the polymerization medium. Additives may include, but are not limited to, a buffer, a colloidal stabilizer, a catalyst, an activator, and/or a promoter. By monomer or polymer seed, herein is meant, a monomer or polymer composition whose particle size and quantity predefines the diameter of the polymer product.

Surfactants that may be useful in the present invention include all anionic, cationic and nonionic surfactants that may be used in emulsion polymerization. Such surfactants include non-fluorinated and fluorinated surfactants. Mixtures of surfactants may be used, including mixtures of non-fluorinated and fluorinated surfactants. Preferred surfactants are non-fluorinated and are anionic surfactant, nonionic surfactant and mixtures thereof. Suitable nonionic surfactants include, but are not limited to: ethoxylated octylphenols; ethoxylated nonylphenols; and ethoxylated fatty alcohols. Suitable anionic surfactants include, but are not limited to: sodium lauryl sulfate; sodium dodecylbenzene sulfonate; sulfated and ethoxylated derivatives of nonylphenols, octylphenols, and fatty alcohols; and esterified sulfosuccinates. Preferred anionic surfactants are sodium lauryl sulfate, salts of fatty acids and sulfated nonylphenoxypoly(ethyleneoxide)ethanol ammonium salt. Suitable cationic surfactants include, but are not limited to: laurylpyridinium chlorides; cetyldimethyl amine acetate; and ($C_8$-$C_{18}$)alkyldimethylbenzyl-ammonium chlorides.

Monomers that may be useful in the present invention include any ethylenically or acetylenically unsaturated monomer. Preferred monomers are ethylenically unsaturated monomers that are capable of undergoing simple free-radical polymerization. Suitable monomers include, but are not limited to, ethylene, vinyl aromatic monomers, such as styrene, α-methylstyrene, o-chlorostyrene, or vinyl toluenes, vinyl halides, such as vinyl chloride or vinylidene chloride, esters of vinyl alcohol with monocarboxylic acids containing from 1 to 18 carbons, such as vinyl acetate, vinyl propionate, vinyln-butyrate, vinyl laurate, and vinyl stearate, esters of α,β-mono-ethylenically unsaturated mono- and di-carboxylic acids containing preferably from 3 to 6 carbons, such as, in particular, acrylic acid, methacrylic acid, maleic acid, fumaric acid, and itaconic acid, with alkanols generally containing from 1 to 12, preferably from 1 to 8 and more preferably from 1 to 4 carbon atoms, such as, in particular, methyl, ethyl, n-butyl, isobutyl, pentyl, hexyl, heptyl, octyl, nonyl, decyl, and 2-ethylhexyl(meth)acrylates, dimethyl or di-n-butyl fumarates and maleates, nitriles of α,β-monoethylenically unsaturated carboxylic acids, such as acrylonitrile, methacrylonitrile, fumarodinitrile, maleinodinitril, and also $C_4$-$C_8$ conjugated dienes, such as 1,3-butadiene and isoprene. The said monomers usually form the main monomers, which, based on the total amount of monomer, add up to a proportion of more than 50 wt %, and preferably more than 80 wt %.

Exemplary monomers include those containing either at least one acid group and/or its corresponding anion or at least one amino, amido, ureido or N-heterocyclic group and/or its ammonium derivatives protonated or alkylated on the nitrogen atom. Examples thereof include but are not limited to α,β-monoethylenically unsaturated mono- and di-carboxylic acids and their amides, such as acrylic acid, methacrylic acid, maleic acid, fumaric acid, itaconic acid, acrylamide and methacrylamide, also vinylsulfonic acid, 2-acrylamido-2-methylpropanesulfonic acid, styrenesulfonic acid and water-soluble salts thereof, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide and 2-(1-imidazolinon-2-yl)-ethyl methacrylate. Normally the aforementioned monomers are present merely in the form of modifying monomers in a concentration of less than 10 wt %, and preferably less than 5 wt %, based on the total amount of monomer.

Monomers which usually increase the structural strength of the filmed polymer matrix normally have at least one epoxy, hydroxyl, N-methylol or carbonyl group or at least two non-conjugated ethylenically unsaturated double bonds. Examples thereof include monomers having two vinyl groups, monomers having two vinylidene groups and monomers having two alkenyl groups. Particularly advantageous here are the diesters of dihydroxylic alcohols with α,β-monoethylenically unsaturated monocarboxylic acids, of which acrylic acid and methacrylic acid are particularly preferred. Examples of such monomers having two non-conjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate, and ethylene glycol dimethacrylate, 1,2-propylene glycol dimethacrylate, 1,3-propylene glycol dimethacrylate, 1,3-butylene glycol dimethacrylate, and 1,4-butylene glycol dimethacrylate, and divinyl benzene, vinyl methacrylate, vinyl acrylate, allyl methacrylate, allyl acrylate, diallyl maleate, diallyl fumarate, methylene bisacrylamide, cyclopentadienyl acrylate, triallyl cyanurate, and triallylisocyanurate. Particularly significant in this context are, in addition, the $C_1$-$C_8$ hydroxyalkyl(meth)acrylates such as n-hydroxyethyl, n-hydroxypropyl or n-hydroxybutyl(meth)acrylates and also compounds such as diacetone acrylamide and acetylacetoxyethyl(meth)acrylate. Frequently the aforementioned monomers are used in a concentration of not more than 10 wt %, and preferably less than 5 wt %, based on the total amount of monomer.

In an emulsion polymerization, it is preferred that the monomers be pre-emulsified prior to adding them to the reactor. When pre-emulsifying the monomers in the present invention, the monomer or monomers are typically combined in any order or simultaneously with one or more emulsifying agents and water.

Catalysts which may be used to cause free radical polymerization of the above monomers include, a thermal initiator, or a redox initiator system composed of an oxidizing agent and a reducing agent. Examples of suitable oxidizing agents include ammonium persulfate, alkali metal persulfates; perborates; peracetates; percarbonates; peroxides, for example hydrogen peroxide, t-butyl hydroperoxide, cumene hydroperoxide, dibenzoyl peroxide, diacetyl peroxide, dodecanoyl peroxide, di-t-butyl peroxide, dilauroyl peroxide, bis (p-methoxy benzoyl) peroxide, t-butyl peroxy pivalate, and dicumyl peroxide; isopropyl percarbonate; di-sec-butyl peroxidicarbonate, and the like, and mixtures thereof.

Examples of suitable reducing agents include alkali metal and ammonium salts of sulfur-containing acids such as sodium sulfite, bisulfite, metabisufite, thiosulfite, sulfide, hydrosulfide, or dithionite; sulfinic acids, such as alkylsulfinic acids, aryl sulfinic acids, and hydroxyalkyl sulfinic acids, and 2-hydroxy-2-sulfinatoacetic acid; amines such as ethanolamine; glycolic acid; glyoxylic acid hydrate; ascorbic acid; isoascorbic acid; lactic acid; glyceric acid; malic acid; tartaric acid and salts of the preceding acids, salts of the preceding acids, and the like, and mixtures thereof. Thermal initiators can be used which decompose or become active at the polymerization temperature. Examples of suitable thermal initiators include those compounds listed above as oxidizing agents. The amount of initiator may be generally from 0.01 to 5 percent by weight based on the total weight of monomer. When a redox system is used, the amount of reducing agent is generally in the range of from 0.01 to 5 percent by weight based on the total weight of monomer.

The polymerization temperature range is generally from 10° C. to 150° C. The temperature range is preferably from 75° C. to 90° C. in the case of persulfate systems. In the case of redox systems, the temperature range is preferably from 20° C. to 75° C. The temperatures of the polymerization medium, surfactant, monomer or polymer seed and any desired additives are selected to achieve an initial temperature at which polymerization is initiated.

In one example of the present invention, a vessel equipped with a single pitched blade agitator and multiple feed inputs may be charged with deionized water and other components to achieve a temperature of 69-71° C. The temperature of the water that is required is a function of the identities, quantities, and temperatures of the other components to be added. The temperature of the water is carefully chosen such that when combined with the other materials that will be charged to the reactor the resulting temperature of the mixture will be within 5° C., preferably within 3° C., and more preferably within 1° C. of the temperature at which the reaction will be initiated. No subsequent addition or removal of heat, either actively or passively, is required thus eliminating the need for a time consuming and costly temperature adjustment and equilibration period. The surfactant is added within 1.5 times a time period required for water addition. All of the surfactant may be added during the time period, a portion of the surfactant may be added during the time period and a remaining portion of the surfactant may be added after the time period, or all of the surfactant may be added after the time period. The surfactant is preferably added during the time period. For example, as shown in the Example in Table 1, if the time period for adding water is 12 minutes, surfactant, being added for 8 minutes, is added within that time period.

Monomer or polymer seed may be added within the time period required for water addition or thereafter. As shown in the Example in Table 1, the seed is added for a time period of 5 minutes, which falls within the 12 minute time period required for water addition. Alternatively, the seed may be added after the 12 minutes. The seed and the surfactant may be added concurrently, sequentially in either order, or in overlapping fashion.

Similarly, during the time period required for water addition or thereafter, any other desired additives may be added to the reactor again either concurrently, sequentially in any order, or in an overlapping fashion. For instance, a buffer (such as, sodium carbonate), a reaction promoter solution (such as, iron salt and an EDTA derivative in deionized water) an initial activator solution (such as, sodium bisulfite or sodium hydrosulfite in deionized water) or an initiator (such as t-butyl hydroperoxide) may be added. As shown in the Example in Table 1, a buffer is added for a time period of 4 minutes, which falls within the 12 minute time period required for water addition.

After all of the contents required for polymerization are added, the resulting temperature of these contents are within about 5° C., preferably within 3° C. and more preferably within 1° C., of the temperature at which the polymerization reaction will be initiated. The polymerization reaction can then be initiated by the addition of catalyst such as ammonium persulfate, in the case of a thermally initiated polymerization, or by the addition of one of the redox initiator components such as t-butyl hydroperoxide or bisulfite, in the case of a redox initiated polymerization.

TABLE 1

| Operation | Comparative (minutes) | Example (minutes) |
|---|---|---|
| Water addition | 12 | 12 |
| Steam and equilibrate | 10 | |
| Surfactant addition | 8 | |
| Buffer addition | 4 | |
| Monomer or Polymer Seed addition | 5 | |
| Catalyst addition | 2 | 2 |
| Total | 41 | 14 |

As shown in the Comparative in Table 1, the polymerization process through the addition of the initiator using the same materials as in the Example of the present invention requires about 41 minutes of processing time. Water, steam, surfactant, buffer and seed are added sequentially to a reactor. By adding all components within the time period of the water addition and choosing the water temperature so that the temperature of the resulting mixture is at the desired 69-71° C., 27 minutes of processing time can be eliminated. By adding surfactant within 1.5 times a time period required for water addition, which in the Example is 12 minutes×1.5 or 18 minutes, and again choosing the water temperature so that the temperature of the resulting mixture is at the desired 69-71° C., at least 12 minutes of processing time is eliminated. Further processing time is eliminated with the addition of other additives during the water addition.

In another example, Example 2, the polymer is prepared similar to Example 1 above, but monomer or polymer seed and any desired additives are added within 1.5 times the time period required for water addition.

TABLE 2

| Operation | Comparative (minutes) | Example (minutes) |
|---|---|---|
| Water addition | 8 | 12 |
| Steam and equilibrate | 6 | |
| Additive | 1 | |
| Buffer addition | 4 | |
| Monomer or Polymer Seed addition | 5 | |
| Catalyst addition | 1 | 1 |
| Total | 25 | 13 |

As shown in the Comparative in Table 2, the polymerization process through the addition of the initiator requires about 25 minutes of processing time. Water, steam, additive, buffer and seed are added sequentially to a reactor. By adding all components within the time period of the water addition and choosing the water temperature so that the temperature of the resulting mixture is at the desired 69-71° C., 12 minutes of processing time can be eliminated. By adding seed and additives within 1.5 times a time period required for water addition, which in the Example is 8 minutes×1.5 or 12 minutes, and again choosing the water temperature so that the temperature of the resulting mixture is at the desired 69-71° C., at least 12 minutes of processing time is eliminated.

I claim:

1. A process for preparing a polymer, comprising:
   selecting temperatures and amounts of a polymerization medium, a surfactant, a monomer or polymer seed, and any desired additives to achieve an initial temperature in a polymerization reactor;
   adding the polymerization medium and surfactant as contents to the polymerization reactor whereby the surfactant is added within 1.5 times a time period required for polymerization medium addition; and
   introducing the monomer or polymer seed and the any desired additives as contents to the polymerization reactor,
   wherein the temperatures and amounts of the contents are selected such that when the additions are completed, the resulting temperature of the contents of the polymerization reactor is within about 5° C. of a temperature at which polymerization is initiated, and
   wherein less than about 5 kcal of energy is removed or added per liter of contents in the reactor; and
   initiating polymerization.

2. The process of claim 1 further comprising:
   adding a catalyst to the polymerization reactor.

3. The process of claim 1 wherein the introducing comprises:
   adding at least one of a monomer emulsion and a monomer mix.

4. The process of claim 1 wherein the selecting comprises:
   heating or cooling the polymerization medium to the selected temperature prior to adding the polymerization medium to the reactor.

5. The process of claim 1 wherein the adding comprises:
   adding the polymerization medium within a first time period;
   adding a portion of the surfactant within the first time period; and
   adding a remaining portion of the surfactant after the first time period.

6. The process of claim 1 wherein the adding comprises:
   adding the polymerization medium within a first time period; and
   adding the surfactant within the first time period.

7. The process of claim 6 wherein the introducing comprises:

adding at least one of the seed and the any desired additives within the first time period.

8. The process of claim 1 wherein polymerization comprises at least one of emulsion, miniemulsion, and suspension polymerization.

9. The process of claim 1 wherein the resulting temperature comprises a temperature within a range of 10° C. to 150° C.

10. A process for preparing a polymer, comprising:

selecting temperatures and amounts of water, a monomer or polymer seed, and any desired additives to achieve an initial temperature in a polymerization reactor;

adding the water, seed and any desired additives as contents to the polymerization reactor whereby the seed and any desired additives are added within 1.5 times a time period required for water addition; and wherein the temperatures and amounts of the contents are selected such that when the additions are completed, the resulting temperature of the contents of the polymerization reactor is within about 5° C. of the initial temperature, and wherein less than about 5 kcal of energy is removed or added per liter of contents in the reactor; and initiating polymerization.

* * * * *